Patented Jan. 19, 1926.

1,570,585

UNITED STATES PATENT OFFICE.

CHARLES J. HOOVER, OF NEW YORK, N. Y.

PLASTIC COMPOSITION.

No Drawing. Application filed March 18, 1925. Serial No. 16,563.

*To all whom it may concern:*

Be it known that I, CHARLES J. HOOVER, a citizen of the United States, and a resident of New York city, New York, now temporarily residing at "Colonial Hall," Asheville, North Carolina, have invented a new and useful Plastic Composition, of which the following is a specification.

The object of my invention is a plastic composition, better known as fire ignition, to be used in fire-places, furnaces, kitchen stoves and ranges and in all other like and similar appliances for starting an instantaneous fire.

My composition consists of the following ingredients which are used relatively in the proportions here described, viz, 3 per cent of finely powdered charcoal; 65 per cent of granulated sawdust; 2 per cent of lycopodium; 30 per cent of crude turpentine, or alternately, 15 per cent of powdered charcoal, 60 per cent of sawdust; 1 per cent of lycopodium, and 24 per cent of crude turpentine.

These ingredients are mixed by first combining the charcoal and the sawdust, to which lycopodium is subsequently added. To these ingredients there is next added heated crude turpentine. By this process of manufacture a paste or mortar is created of a consistency which is readily molded into round or circular sticks of approximately four and one-half inches in length and an inch and a quarter in diameter.

A mixed composition of ingredients may then be formed or moulded in a round or circular stick by any ordinary means now known to the art for handling such plastic compositions.

My composition is black in color, may be tubular or any desired shape formed by the press, and is non-inflammable until it is ignited by the application of a match.

Claims.

1. A fire-kindler comprising 8% charcoal, 60% granulated saw-dust, 2% lycopodium and 30% crude turpentine.

2. A fire-kindler composed of powdered charcoal, granulated sawdust, lycopodium and crude turpentine, combined and produced in stick-like form to facilitate packing and handling.

CHARLES J. HOOVER.